March 7, 1961
E. T. WYMAN
2,973,795
TIRE VALVE
Filed Jan. 31, 1950
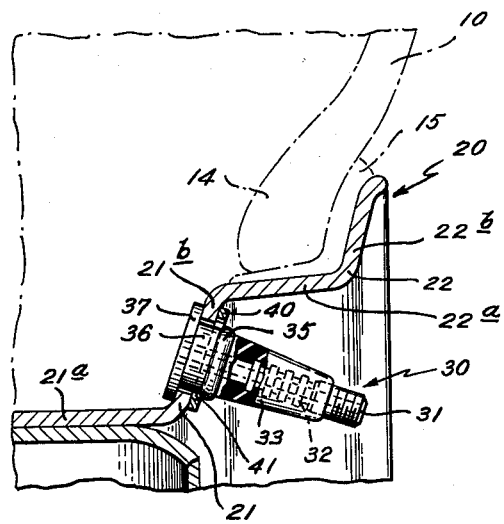
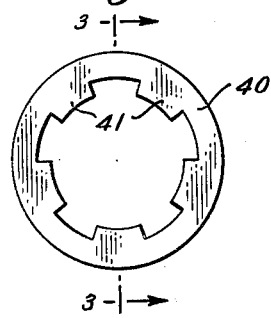
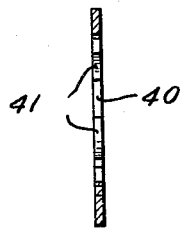
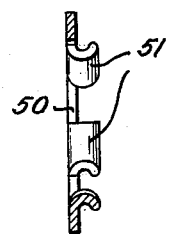
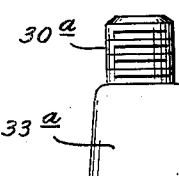
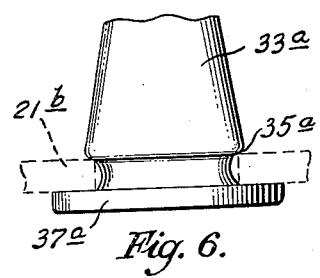
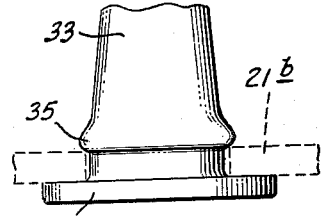
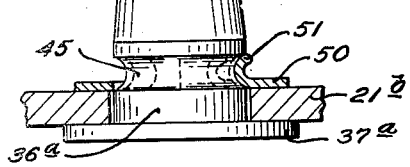
Inventor,
Edwin T. Wyman,
by Dike, Calver + Porter
Attys.

United States Patent Office 2,973,795
Patented Mar. 7, 1961

2,973,795

TIRE VALVE

Edwin T. Wyman, Brookline, Mass.,
(319 Longwood Ave., Boston, Mass.)

Filed Jan. 31, 1950, Ser. No. 141,503

4 Claims. (Cl. 152—427)

This invention relates to a tire valve, designed particularly to be used in the so-called tubeless tire, in which the tire casing forms an inflatable chamber or cavity, which when inflated supports the vehicle. In the tubeless tire the standard inner tube is eliminated, and the tire casing is mounted directly on the standard wheel rim, and a valve is provided which is preferably fixed in the side wall of the drop-center portion of the rim, whereby the tire casing may be inflated. The tire casing and the wheel rim, in combination thus form an inflatable chamber which supports the vehicle.

It is, of course, essential in the tubeless tire that there be no leakage of air, and the sealing around the valve stem is important for the successful operation of the tire. There should be no possibility of leakage of air around the valve, and it should be readily insertable in the wheel rims used on automobiles. I have devised a valve which is substantially leakproof, and which can be readily inserted in the wheel rim and thus be quickly made ready for use. My valve omits the threaded valve stem, the packing and tightening nut, commonly used on conventional valves with which I have been familiar. My valve thus costs less to manufacture and to apply to the wheel rim.

Briefly, my invention comprises a tubular metal valve stem, having a central longitudinal air passage therethrough, and a standard check valve is carried in the central air passage. A covering of flexible rubber is molded to the valve stem, which at the bottom may enlarge into a flat circular base. Abutment means is then provided for a snap-in fitting or retention of the valve in position on the wheel rim, which comprises two alternative forms, a flexible annular bead molded into the rubber covering adjacent the lower end of the valve stem, or an annular concave groove formed in the rubber covering at the same location, into which a retaining ring can be engaged. With the annular beaded form of retention, a retaining ring can also be used if desired.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a side elevation of one form of my valve, with a portion in section;

Fig. 2 is a plan view of a retaining ring which may be used with the valve shown in Fig. 1;

Fig. 3 is a section of the retaining ring on lines 3—3 of Fig. 2;

Fig. 4 is a sectional view of a second form of retaining ring;

Fig. 5 is a front elevation of a modified form of valve, partly in section, and showing the retaining ring of Fig. 4 mounted thereon;

Fig. 6 is a side elevation of a valve designed to be used without a retaining ring, wherein the lower portion of the valve stem 33a has a straight and gradual taper to the top of the retaining bead 35a, and Fig. 7 is a side elevation of a valve provided with an annular bead disposed in spaced relation to the enlarged flange, which valve is mounted on a wheel rim without a retaining ring.

In Fig. 1 the first form of my valve is shown mounted on a wheel rim in position for use with a tubeless tire. However it may be used in conjunction with any type of tubeless tire. Numeral 10 represents a standard rubber tire casing having a beaded edge 14. An annular band of soft rubber may be inserted between the beaded edge 14 of the tire casing and the wheel rim as indicated at 15. The wheel rim on which the tire casing 10 is mounted is shown generally at 20, and is of the standard drop-center type having the drop-center portion 21 and comprising the bottom wall 21a and side wall 21b, with angular recesses 22 at the sides thereof, which comprise the bottom wall 22a, and the side wall 22b, into which the angular outer surface of the beaded edge 14 of the tire casing is designed to fit. My valve is shown mounted in the side wall 21b of the drop-center portion of the wheel rim, in a suitable aperture provided therein, generally indicated at 30, and comprises the tubular metal valve stem 31 having a central longitudinal air passage therethrough, which delivers air into the interior of the tire casing. A standard check valve (not shown) is provided in the central air passage. Annular corrugations 32 are preferably provided on the exterior of valve stem 31 for better retaining the rubber covering 33 molded and vulcanized to the valve stem. The base portion of the rubber covering 33 is provided with an enlarged annular bead 35 molded into the rubber covering 33 toward the lower end of the valve stem, and a second enlarged flange or disk 37 is spaced apart from the annular bead 35 by the ankle portion 36. It will be noted that the ankle portion 36 fits into the aperture formed in the side wall 21b of the wheel rim 20, and that the adjacent abutment formed by the wall of annular bead 35 and the facing wall of circular disk 37 in effect constitute rings for retaining the valve 30 in position in the aperture in the wheel rim. In Fig. 1 a retaining ring 40, shown in detail in Fig. 2, is shown positioned on the ankle portion 36 of the valve 30, but it will be understood that the retaining ring 40 may be dispensed with entirely as is shown in Figures 6 and 7, and in that situation the annular bead 35 is preferably lowered to the position which the retaining ring 40 occupies, and thus to closely engage the side wall 21b and act as a lamping member holding the valve stem in position, thus making an effective air seal between the flanged base of the valve stem and the inner surface of the rim side wall 21b. It will be understood that in operation the valve 30 is merely pushed through the aperture provided therefor in the side wall 21b in the wheel rim 20, until annular bead 35 clears the side wall 21b, and effectively clamps the valve 30 in position. But as previously stated, and as shown in Fig. 1, the retaining ring 40 may be passed from the outside over the annular ring 35, after the valve 30 has been inserted in the rim for more tightly gripping the side wall 21b of the wheel rim 20. After the annular band 15 is placed in position in the angular recesses 22 of the rim 20, the tire casing 10 is then mounted on the rim 20 in the usual manner, with the beaded edge 14 of the tire casing pressing against the annular rubber band 15 and the angular recesses 22 provided in the side of the rim 20.

In Fig. 2 the retaining ring 40 is shown in detail in plan view. It will be noted that the ring 40 is provided with inwardly extending spring tabs 41, the inner circumferential edge of which is smaller than the peripheral edge of the annular rubber bead 35 of the valve 30. The ring 40 is shown in vertical section in Fig. 3 on line 3—3 of Fig. 2. It will thus be noted that the annular rubber bead 35 eliminates the threaded metal stem packing and tightening nut now used on the conventional valve stems. My valve is quickly inserted in position in the rim, and the annular bead 35 and base flange 37 (with or without the retaining ring 40) hold the valve stem fixed in position as an integral part of the wheel rim. The air pressure against the broad, soft, rubber base 37 prevents the leakage of air around the stem.

In Fig. 5 a modified form of valve 30a is shown, with rubber covering 33a, ankle portion 36a, the base which engages the aperture in side wall 21b of the wheel rim 20, and base flange 37a. This form of valve differs from that shown in Fig. 1 in that the annular rubber bead 35 is replaced with an annular groove 45, and a retaining ring 50 (shown in vertical section in Fig. 4) has inwardly extending curved spring tabs 51 which expand into the groove 45, when the valve 30a is positioned in the side wall of the rim, as shown in Fig. 5. When the valve 30a is inserted in position through the side wall 21b of the wheel rim, it will be understood that the retaining ring 50 is slipped over the top of the valve 30a and pushed into the groove 45 provided therein, whereby the spring tabs tightly engage the groove and the retaining ring 50, with rubber base flange 37a tightly clamping the walls 21b of the wheel rim and effectively preventing the leakage of air around the valve.

The modification of valve shown in Figure 6 facilitates the insertion of the valve stem through the hole in the wheel rim 21b due to the taper of the lower side portion of the valve stem. After the valve has been inserted in the hole in wheel rim 21b as shown in Figure 6, the valve stem is held in position by and an effective seal is produced between the flanged base 37a and the abutment or lower side of bead 35a.

After the valve stem 33 of the valve shown in Figure 7 is inserted through the hole in rim 21b, the abutment or lower side of bead 35 closely engages the wheel rim 21b and together with base of flange 37 serves as clamping means for holding the valve stem in position to produce an effective seal between the flanged base 37 and the inner surface of the rim side wall 21b.

It will thus be seen that I have provided a valve suitable for use with a tubeless tire, which can be readily inserted in the wheel rim and made ready for use, and which effectively prevents the leakage of air from around the valve, and contributes toward making the tubeless tire a satisfactory and practical device. It will, of course, be understood that the term "rubber" as used herein indicates both natural and synthetic rubber, and substances having rubber-like properties and characteristics as full equivalents.

I claim:

1. A valve structure insertable through a hole provided in the side wall of a wheel rim for use in inflating tubeless tires comprising a tubular metal valve stem having a central air passage therethrough and a check valve therein, and a rubber covering on said valve stem having a flanged base and an annular groove spaced from said flanged base, and an annular retaining ring having inwardly extending curved spring tabs for engaging in said groove, said flanged base and retaining ring adapted to tightly engage opposite sides of the side wall of a wheel rim.

2. A valve structure insertable through an aperture provided in the side wall of a wheel rim for use in inflating a tubeless tire mounted thereon, comprising a tubular valve stem having a central air passage therethrough and a check valve therein, a rubber covering on said valve stem having a flanged base, a retaining ring disposed in engaging relation with said rubber covering and located in spaced relation to said flanged base, and an ankle portion formed in said rubber covering between said flanged base and said retaining ring and adapted to fit into said wheel rim aperture, said flanged base and retaining ring adapted to engage opposite sides of the wheel rim tightly when said ankle portion is fitted into the aperture to form an airtight connection with said rim.

3. A valve structure insertable through an aperture provided in the side wall of a wheel rim for use in inflating a tubeless tire mounted thereon, comprising a tubular metal valve stem having a central air passage therethrough and a check valve therein, a flexible rubber covering mounted on said valve stem having a flanged base, a snap-on annular retaining ring and an annular groove spaced from said flanged base with which a portion of said snap-on annular retaining ring engages to mount said ring on said rubber covering, said flanged base and retaining ring adapted to engage tightly opposite sides of the wheel rim to form an airtight connection with said rim.

4. A valve structure insertable through an aperture provided in the side wall of a wheel rim for use in inflating a tubeless tire mounted thereon, comprising a tubular stem having a central air passage therethrough and a check valve therein, a rubber covering on said valve stem having a flanged base, an annular groove spaced from said flanged base and a snap-on annular retaining ring disposed upon said covering and located in cooperating relation to said annular groove, said flanged base and retaining ring adapted to engage tightly opposite sides of the wheel rim to form an airtight connection with said rim.

References Cited in the file of this patent

UNITED STATES PATENTS

| | | |
|---|---|---|
| 1,037,010 | Irons | Aug. 27, 1912 |
| 2,018,584 | Watson | Oct. 22, 1935 |
| 2,038,473 | Bronson | Apr. 21, 1936 |
| 2,049,252 | Eberhard | July 28, 1936 |
| 2,064,695 | Sipe | Dec. 15, 1936 |
| 2,261,833 | Kreyer | Nov. 4, 1941 |
| 2,475,451 | Gouirand | July 5, 1949 |
| 2,587,470 | Herzegh | Feb. 26, 1952 |
| 2,634,785 | Tubbs | Apr. 14, 1953 |